United States Patent [19]
Enami

[11] Patent Number: 5,374,795
[45] Date of Patent: Dec. 20, 1994

[54] WIRE CUT ELECTRIC DISCHARGE MACHINE

[75] Inventor: Masato Enami, Oshino, Japan
[73] Assignee: Fanuc, Minamitsuru, Japan
[21] Appl. No.: 108,651
[22] PCT Filed: Dec. 24, 1992
[86] PCT No.: PCT/JP92/01691
   § 371 Date: Aug. 30, 1993
   § 102(e) Date: Aug. 30, 1993
[87] PCT Pub. No.: WO93/13902
   PCT Pub. Date: Jul. 22, 1993

[30] Foreign Application Priority Data
Jan. 18, 1992 [JP] Japan ................................ 4-025627

[51] Int. Cl.$^5$ .............................................. B23H 7/10
[52] U.S. Cl. ............................ 219/69.12; 219/69.14
[58] Field of Search .................... 219/69.12, 69.14

[56] References Cited

U.S. PATENT DOCUMENTS

| | | | |
|---|---|---|---|
| 4,565,915 | 1/1986 | Girardin | 219/69.12 |
| 4,647,747 | 3/1987 | Goto | 219/69.12 |
| 4,808,786 | 2/1989 | Shinkai et al. | 219/69.12 |
| 4,918,279 | 4/1990 | Babel et al. | 219/69.12 |
| 5,028,757 | 7/1991 | Aramaki et al. | 219/69.12 |
| 5,111,016 | 5/1992 | Lodetti et al. | 219/69.12 |
| 5,171,955 | 12/1992 | Hosaka et al. | 219/69.12 |
| 5,196,666 | 3/1993 | Hosaka | 219/69.12 |

FOREIGN PATENT DOCUMENTS

| | | | |
|---|---|---|---|
| 4002191A1 | 8/1990 | Germany . | |
| 1-257522 | 10/1989 | Japan . | |
| 2-36021 | 2/1990 | Japan . | |
| 4-159023 | 6/1992 | Japan | 219/69.14 |
| 4-275824 | 10/1992 | Japan | 219/69.12 |

*Primary Examiner*—Geoffrey S. Evans
*Attorney, Agent, or Firm*—Staas & Halsey

[57] ABSTRACT

An immersion type wire cut electric discharge machine is provided with a sealing structure for sealing a gap between a machining liquid tank and a lower arm while permitting movement of the tank relative to the arm, and nozzles for preventing sludge from adhering to the inner surface of a slide member of the sealing structure. A slide seal includes a slide plate through which the lower arm extends. A guide mechanism for guiding the slide plate while keeping the plate in close contact with a tank wall of the machining liquid tank is formed in the tank wall, through which the lower arm extends. The nozzles are arranged inside the machining liquid tank and inject fluid toward the inner surface of the slide plate.

4 Claims, 2 Drawing Sheets

WIRE CUT ELECTRIC DISCHARGE MACHINE

TECHNICAL FIELD

The present invention relates to a sealing structure for a machining liquid tank of an immersion type wire cut electric discharge machine.

BACKGROUND ART

FIG. 4 schematically illustrates a conventional immersion type wire cut electric discharge machine 1. A wire 11 is drawn from a wire reel 12 arranged on an upper arm 4a, and guided along a brake roller 13 and an upper guide roller 14 to a lower guide roller 15 arranged in a lower arm 4b. A workpiece 3 is placed in a machining liquid tank 2 between the upper and lower guide rollers 14 and 15. Electric discharge is induced between the wire 11 and the workpiece 3 immersed in a machining liquid contained in the machining liquid tank 2, thereby causing the workpiece 3 to undergo electric-discharge machining. This type of wire cut electric discharge machine is suited for a machining operation, such as an end-face machining of a thick plate, that requires a sufficient amount of machining liquid to be supplied to a discharging spot and thus, cannot be properly carried out with a nozzle jet type machine in which machining liquid is injected from a nozzle to a machining part of a workpiece.

The immersion type wire cut electric discharge machine must be constructed so that the lower arm 4b is kept projected into the machining liquid tank 2. The machining liquid tank 2 is placed on an X-Y table 5 and is moved relative to the lower arm 4b. Thus, a sealing structure must be provided at a portion A where the lower arm 4b penetrates a tank wall 6 so that the machining liquid tank 2 is allowed to move relative to the lower arm 4b without causing leakage of the machining liquid.

Specifically, the sealing structure must have a construction such that the machining liquid tank 2 can be moved in a horizontal plane in directions perpendicular to each other with respect to the lower arm 4b.

DISCLOSURE OF THE INVENTION

An object of the present invention is to provide a sealing structure, which permits movement of a machining liquid tank relative to a lower arm and can prevent sludge from adhering to an inner surface of a slide member.

A wire cut electric discharge machine according to the present invention comprises: seal means provided at a tank wall of a machining liquid tank where a lower arm extends, and having a slide member through which the lower arm extends and a guide member for guiding the slide member while keeping the slide member in close contact with the tank wall. Additionally, nozzle means are arranged inside the machining liquid tank, for injecting a fluid toward an inner surface of the slide member.

The fluid spouted from the nozzle agitates the machining liquid in the vicinity of the inner surface of the slide member, whereby sludge is prevented from adhering to the inner surface of the slide member.

BEST MODE OF CARRYING OUT THE INVENTION

Figure 3:
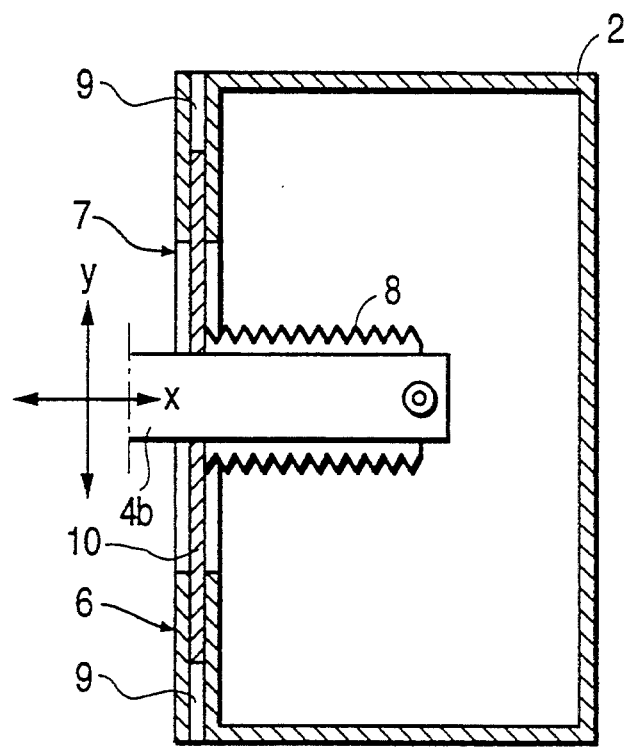
FIG. 3 is a horizontal sectional view showing a sealing structure for a machining liquid tank.
Figure 4:
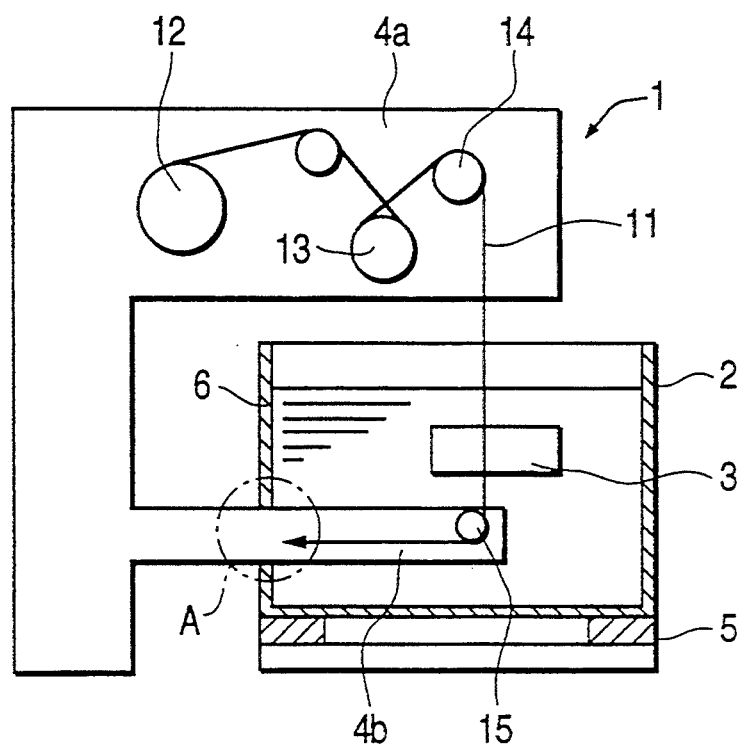
FIG. 4 is a partially sectional front view of a conventional electric discharge machine.

Referring to FIG. 3, an immersion type wire cut electric discharge machine has a lower arm 4b penetrating a tank wall 6 of a machining liquid tank 2. A sealing structure 7 is provided at a portion of the machine where the lower arm 4b penetrates the tank wall 6.

The sealing structure 7 is composed of a slide seal, which permits movement of a machining liquid tank 2 in a Y direction relative to the lower arm 4b while sealing the gap between the tank 2 and the arm 4b, and a bellows 8, which permits movement of the machining liquid tank 2 in an X direction relative to the lower arm 4b while sealing the gap between the tank 2 and the arm 4b.

The slide seal includes a guide mechanism, which is formed by a groove 9 in the tank wall 6 through which the lower arm 4b extends, and a slide plate 10 to be guided along the groove 9. The lower arm 4b penetrates the slide plate 10 and is allowed to slide only in the X-axis direction relative to the plate 10. One end of the bellows 8 is closely fastened to a distal end of the lower arm 4b, and the Other end of the bellows 8 is closely fastened to the slide plate 10, whereby the interior of the bellows 8 is isolated from the machining liquid in the machining liquid tank 2.

The sealing structure described above effectively reduces the leakage of liquid, and the machining liquid tank 2 can smoothly be moved relative to the lower arm 4b. However, since the inner surface of the slide plate 10 always contacts the machining liquid, sludge (e.g., fine particles of metal solidified after melting, metallic oxides insoluble in water, etc.) suspended in the liquid is likely to adhere to the inner surface of the slide plate as a machining operation is continued over time. If the sludge enters the groove 9 and then between the slide plate 10 and the tank wall, smooth movement of the slide plate 10 will be hindered.

As a result, when the machining liquid tank 2 is moved in the Y-axis direction, both the tank 2 and the lower arm 4b will be subjected to force. This causes a lower guide roller provided at the distal end of the lower arm 4b to be displaced or the effect of backlash to increase due to increase of the resistance to the movement of the table, possibly lowering the machining accuracy.

When sludge has adhered to the slide plate, it may be removed by the operator when necessary, but such sludge removal will become an obstacle to full automation of processes in the case of a long term automatic operation or when controlling a large number of wire cut electric discharge machines.

Figure 1:
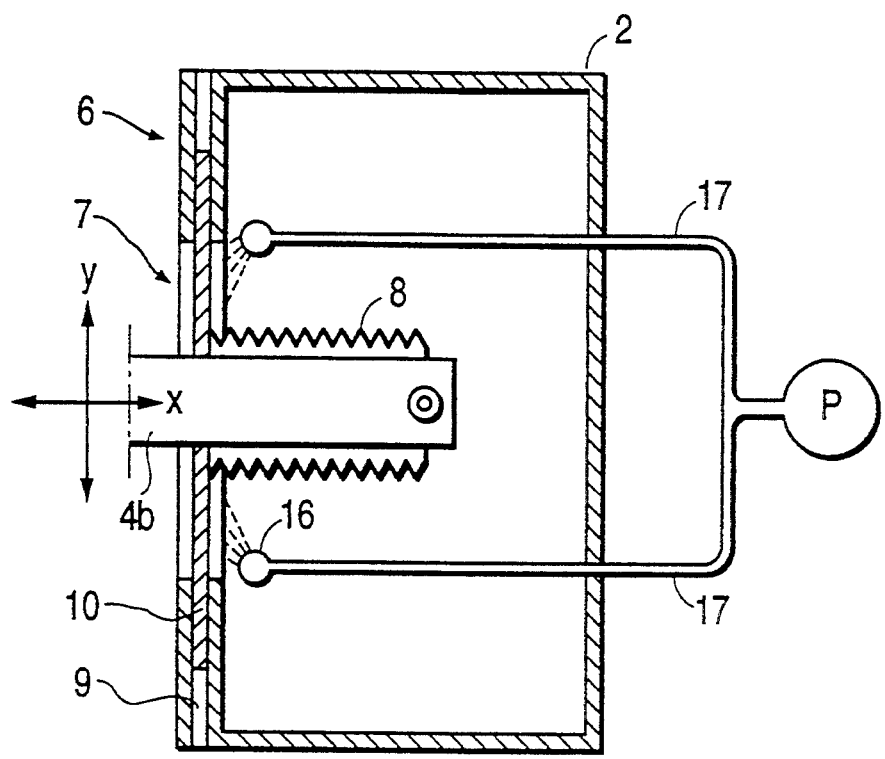
FIG. 1 is a horizontal sectional view of a principal part of a wire cut electric discharge machine according to one embodiment of the present invention.
Figure 2:
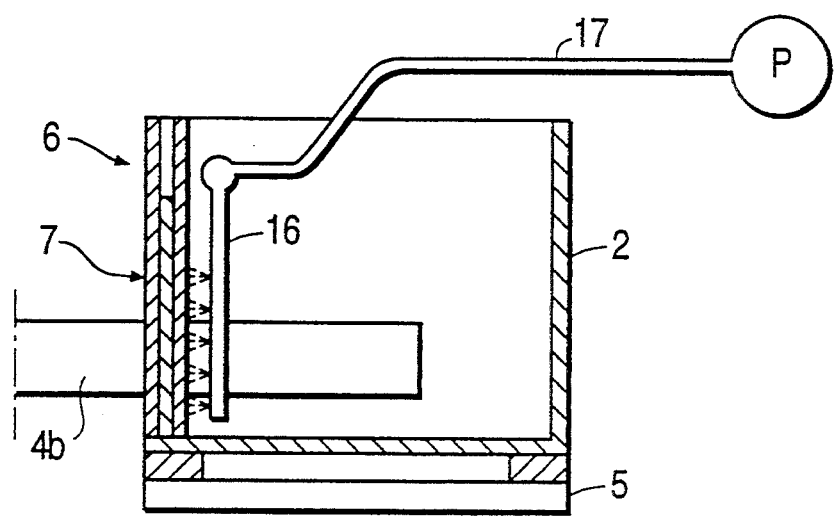
FIG. 2 is a vertical sectional view of the wire cut electric discharge machine shown in FIG. 1.

According to the present invention, nozzles 16 for injecting a fluid toward the inner surface of the slide plate 10 are arranged in the machining liquid tank 2, as shown in FIGS. 1 and 2. The nozzles 16 are located close to the inner surface of the slide plate 10 on both sides of the lower arm 4b. The nozzles 16 are connected to a pump P through piping 17 so that machining liquid as the fluid to be injected is pressurized by the pump P and supplied to the nozzles 16. The machining liquid is injected from the nozzles 16 toward the inner surface of the slide plate 10. In this embodiment, the system for supplying the machining liquid to the nozzles 16 is separated from the system for circulating the machining liquid through the tank 2. As shown in FIG. 2, the respective nozzles 16 extend vertically and have a plurality of injection holes spaced from one another. The injection pressure is set to a value large enough to prevent sludge from entering between the slide plate 10 and tank wall facing the slide plate 10.

With the above-described arrangement, during a machining operation by means of wire cut electric discharge, the nozzles 16 inject the machining liquid so that the machining liquid in the vicinity of the inner surface of the slide plate 10 is agitated. Thus, sludge is prevented from adhering to the slide plate 10. Consequently, the machining liquid tank can always be moved smoothly relative to the lower arm, and any decline of machining accuracy can be prevented.

In another embodiment of the present invention, each of the nozzles 16 may have a single injection hole through which a fluid is injected to form a jet stream. Further, a gas may be used as the injection fluid in such a manner that fine bubbles are spouted from the nozzles 16. When using the machining liquid as the injection fluid, the machining liquid circulating through the machining liquid tank may be diverted for the injection.

I claim:

1. An immersion type wire cut electric discharge machine having an upper arm and a lower arm, said lower arm being projected into a machining liquid tank, said machine comprising:

seal means provided at a tank wall of said machining liquid tank where said lower arm passes therethrough, said seal means including a slide member through which said lower arm passes and a guide member for guiding said slide member while keeping the slide member in close sealing contact with the tank wall; and nozzle means disposed inside the machining liquid tank and having an injection hole facing an inner surface of said slide member for injecting a fluid toward said inner surface of said slide member.

2. The immersion type wire cut electric discharge machine according to claim 1, wherein said seal means further comprises a bellows having one end fastened in sealing relationship to a distal end of said lower arm and another end fastened in sealing relationship to said slide member.

3. The immersion type wire cut electric discharge machine according to claim 1, wherein said nozzle means comprises a pair of nozzles, one of said nozzles being mounted on one side of said lower arm and the other of said nozzles being mounted on an opposite side of said lower arm, each of said nozzles extending vertically inside the machining liquid tank and having a plurality of injection holes vertically spaced from one another.

4. The immersion type wire cut electric discharge machine according to claim 1, wherein said guide member comprises a groove in said tank wall.

* * * * *

UNITED STATES PATENT AND TRADEMARK OFFICE
CERTIFICATE OF CORRECTION

PATENT NO. : 5,374,795
DATED : December 20, 1994
INVENTOR(S) : Masato ENAMI

It is certified that error appears in the above-indentified patent and that said Letters Patent is hereby corrected as shown below:

Column 1, line 49, change "tile" to --the--.

Column 2, line 35, change "Other" to --other--;

line 49, after "wall" insert --6--.

Column 3, line 20, change "is agitated" to

--is always agitated--.

Signed and Sealed this

Twenty-first Day of March, 1995

Attest:

BRUCE LEHMAN

Attesting Officer

Commissioner of Patents and Trademarks